United States Patent [19]

Schlinger

[11] 4,158,948

[45] Jun. 26, 1979

[54] CONVERSION OF SOLID FUELS INTO FLUID FUELS

[75] Inventor: Warren G. Schlinger, Pasadena, Calif.

[73] Assignee: Texaco Inc., New York, N.Y.

[21] Appl. No.: 934,120

[22] Filed: Aug. 16, 1978

[51] Int. Cl.² ............................. F02G 3/00; C10J 3/00
[52] U.S. Cl. .................................. 60/39.02; 60/39.12; 48/197 R; 48/210; 60/648; 208/8 LE
[58] Field of Search ............... 48/197 R, 202, 206, 48/210, 212, 215; 208/8 LE; 60/39.02, 39.12, 648

[56] References Cited

U.S. PATENT DOCUMENTS

| 3,986,349 | 10/1976 | Egam | 60/39.02 |
| 4,050,908 | 9/1977 | McNamee | 208/8 LE |
| 4,085,578 | 4/1978 | Kydd | 60/39.12 |
| 4,097,361 | 6/1978 | Ashworth | 48/197 R |
| 4,099,382 | 7/1978 | Paull et al. | 48/197 R |
| 4,099,932 | 7/1978 | Child | 48/197 R |

Primary Examiner—S. Leon Bashore
Assistant Examiner—Peter F. Kratz
Attorney, Agent, or Firm—Thomas H. Whaley; Carl G. Ries; Robert Knox, Jr.

[57] ABSTRACT

Solid carbonaceous fuels are converted into gaseous fuels by a process comprising liquefying at least a portion of the solid fuel, subjecting a portion of the high boiling product to gasification with substantially pure oxygen to provide hydrogen for the liquefaction, subjecting the balance of the high boiling product to gasification with air to provide a gaseous product used as the stripping medium to remove lighter boiling materials from the liquefaction product and recovering fuel gas from the stripping zone overhead.

10 Claims, 1 Drawing Figure

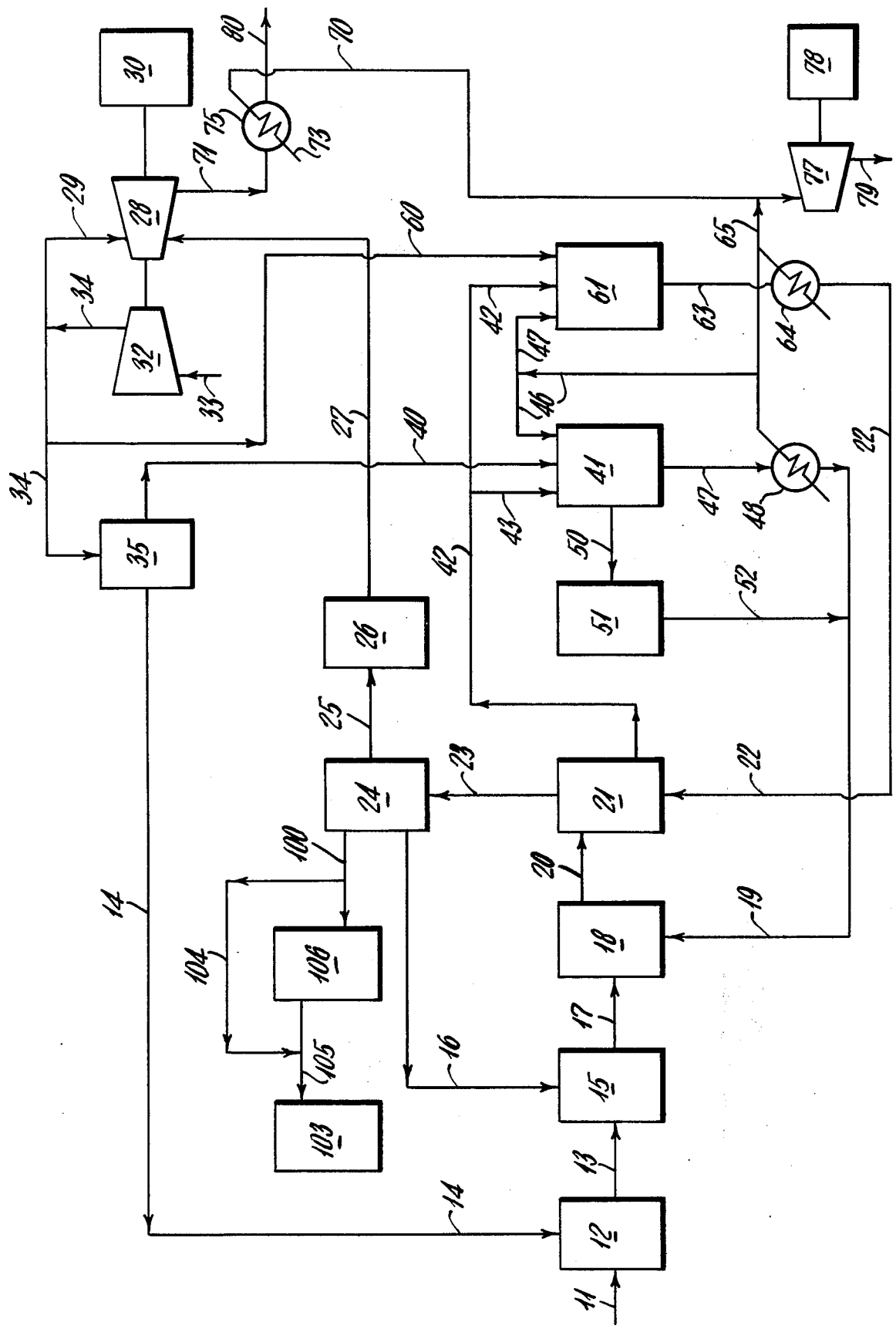

CONVERSION OF SOLID FUELS INTO FLUID FUELS

This invention is concerned with the conversion of solid fuel into fluid fuels. More particularly, it is concerned with the conversion of solid fuel into gaseous fuels and in a more specific embodiment into a gaseous fuel which can be converted into electrical energy with a minimum of environmental pollution and also a storable liquid fuel for use as needed.

Since the oil embargo of several years ago, considerable emphasis has been placed on the use of solid fossil fuels for the production of energy, particularly electrical energy. Unfortunately, when coal is burned in a conventional powerhouse, the amount of ash and sulfur emitted to the atmosphere presents environmental problems. It has been suggested that coal be gasified to produce a gas for use in a gas turbine. However, in a combined cycle power system which is a preferred type of operation, a suitable gas is one having a heating value of about 100 to 150 BTU/SCF. When a solid fossil fuel to be gasified is introduced into a gasifier as a water slurry and is gasified by partial combustion with air, generally the product gas contains about 60–90 BTU/SCF. When high purity oxygen is used as the gasifying agent, the product gas generally has a heating value in excess of 300 BTU/SCF. However, in a combined cycle power system, it is much more desirable for the fuel gas to have a heating value of 100 to 150 BTU/SCF.

In addition, the introduction of solid fuel into a gasifier presents mechanical problems, particularly if the gasifier is operated at superatmospheric pressures.

It is therefore an object of this invention to convert solid fossil fuel into electrical energy. Another object is to produce a fuel gas having a heating value of between about 100 and 150 BTU/SCF. Still another object of this invention is to convert sulfur-containing solid fossil fuel into electrical energy with a minimum of environmental pollution. These and other objects will be obvious to those skilled in the art from the following disclosure.

According to my invention, there is provided a process for the production of a fuel gas having a heating value of about 100 to 150 BTU/SCF which comprises mixing finely-divided solid fuel with a solvent therefor, heating the mixture to a temperature of between about 700 and 950° F. at a pressure between about 500 and 5000 psig in the presence of added hydrogen to solubilize at least a portion of said solid fuel, separating from the resulting mixture material boiling below about 900° F., subjecting between about 20 and 50% of the remainder, boiling above about 900° F., to partial oxidation with substantially pure oxygen in a first partial oxidation zone to produce a first product gas composed principally of CO and $H_2$, passing at least a portion of said first product gas to the solubilizing zone as said added hydrogen, subjecting the balance of said remainder boiling above about 900° F. to partial oxidation with a gas comprising air in a second partial oxidation zone to produce a second product gas comprising carbon monoxide, hydrogen and nitrogen, transferring said second product gas to said separation zone to assist in the separation of said portion boiling below about 900° F. and recovering from said portion boiling below about 900° F. a third product gas having a heating value between about 80 and 200/BTU/SCF.

The solid fuels which may be treated by the process of this invention include fuels such as anthracite, bituminous coal, sub-bituminous coal, lignite, petroleum coke, organic waste and the like. The feed solid fuel should be ground so that at least 80% and preferably 100% passes through a U.S. standard 14 mesh sieve. The solid fuel should have a moisture content no greater than 5% and preferably less than 3%. Accordingly, if the fuel contains a higher percentage of water it may be subjected to drying with an inert gas such as flue gas, nitrogen and the like. The drying may take place before, simultaneously with or after the grinding, preferably simultaneously with or after.

In the following specification, for the sake of simplicity, the solid fuel is referred to as "coal" but it should be kept in mind that the term "coal" is used in a generic sense.

After the coal has been ground and dried, it is contacted with a solvent therefore. The solvent is primarily a hydrocarbon liquid having a boiling range between about 350° to 900° F. preferably between about 500° F. and 800° F. For startup purposes, the solvent may comprise an oil such as anthracene oil, creosote oil, petroleum fractions such as cycle gas oil, and other hydroaromatic compounds such as decalin and tetralin. After startup, a portion of the product may serve as solvent. The solvent should be present in the mixture in an amount between about 0.75 and 5 parts by weight per part of coal, preferably between about 1 and 4 parts by weight solvent per part by weight coal.

The coal-solvent mixture is heated to a temperature between about 700°–950° F. and then transferred to a solvation zone. The heating is effected, in a preferred embodiment, by passing the mixture under conditions of turbulent flow through a tubular heating zone having a length to diameter ratio of at least 100 and preferably at least 1000. The heating takes place under pressure conditions of from about 500 to 5000 psig, preferably from 1000 to 1500 psig. In a preferred embodiment, hydrogen is introduced into the coal-solvent mixture prior to its introduction into or during its presence in the solvation zone. Actually the addition of external hydrogen is not essential to the operation of the process as the preferred solvents act as hydrogen donors but hydrogen addition is a preferred mode of operation.

The added hydrogen may be introduced as a gas containing at least about 40% hydrogen and may contain as much as 95% hydrogen or higher. It may be introduced as synthesis gas produced by the partial oxidation of carbonaceous fuel, as catalytic reforming by-product gas or as substantially pure hydrogen produced by the shift conversion of partial oxidation process product gas followed by $CO_2$ removal. In this respect the term "hydrogen" is intended to include impure hydrogen. The mixture of coal-solvent and additionally optional hydrogen is maintained in the solvation zone under substantially the same conditions of temperature and pressure as the heating zone for a period of time between about 10 seconds and 30 minutes preferably from 30 seconds to 20 minutes. When hydrogen is added to the coal-solvent mixture, it may be present in an amount between about 2 and 100 SCF/lb. of coal introduced into the solvation zone preferably about 5 and 20 SCF/lb. of coal. In this instance, the SCF refers to the actual amount of hydrogen in the gas.

On leaving the solvation zone the solvent and coal mixture optionally containing added hydrogen is introduced into a stripping zone preferably at the top thereof where hydrogen and vapors formed during the heating-dissolving steps are separated from the undissolved coal. The temperature in the stripping zone is maintained at substantially the same temperature as the solvation zone e.g. about 700°–900° F. but the pressure may be reduced to about 300–600 psig.

The liquid phase comprising solvent, liquefied coal and unconverted coal passes downwardly through the stripping zone in countercurrent contact with a gas comprising hydrogen, nitrogen and carbon monoxide which is introduced at a rate of at least 1000 SCF per barrel of liquid material introduced into the stripping zone, preferably between 3000 and 20,000 SCF per barrel. The stripping gas is introduced at the bottom of the stripping zone to flow upwardly therethrough in a countercurrent contact with the descending liquid stream. During this upward flow the stripping gas will cause additional separation of dissolved vaporous material from the liquid phase and, because of the extended time at elevated temperature, additional cracking takes place in the stripping zone with the formation of additional vaporous material which is transported upwardly by the stripping gas. In this way, most of the solvent and much of the liquefied coal is transported overhead from the stripping zone.

The stripping zone overhead comprising hydrogen, nitrogen, carbon monoxide, vaporous hydrocarbons and entrained liquid hydrocarbons is separated into a liquid portion and a normally gaseous fraction having a heating value of about 100 to 150 BTU/SCF. The normally liquid portion is separated into a light fraction which is sent to storage, a heavier fraction boiling up to about 900° F. which is recycled as solvent for the preparation of additional coal-solvent slurry and a residual portion boiling above about 900° F. The cut point between the lighter and heavier fraction is chosen to maintain a solvent balance that is, to provide sufficient solvent for the fresh coal feed. Ordinarily, the cut point will range between 400° and 600° F. The lighter fraction may be retained in the system for gasification to assist in meeting peak loads or may be exported from the system for other use as fuel. In the latter event, advantageously, it is subjected to catalytic hydrodesulfurization prior to storage or export.

The normally gaseous material separated from the stripper overhead is subjected to treatment for removal of sulfur compounds such as by scrubbing with an ethanolamine solution. It is then suitable for combustion with air for operation of a gas turbine which is coupled to an electric generator. The exhaust gases from the gas turbine are clean and may be released to the atmosphere without additional treatment.

The bottoms from the stripping zone, that is, the residue boiling above about 900° F. is separated into a smaller portion usually about 20–50% which is subjected to gasification by partial oxidation using substantially pure oxygen as the gasifying agent. The coal-solvent slurry is introduced into the oxygen gasifier at an oxygen to carbon atomic ratio between about 0.8 and 1.2 preferably between 0.85 and 1.1. Also introduced into the oxygen gasifier is steam at a rate of between about 0.3 and 0.5 lbs. of steam per lb. of residue. Temperature in the oxygen gasifier is maintained between 1800° and 3200° F. preferably between 2000° and 2800° F. Preferably the pressure in the oxygen gasifier is between 1000 and 1500 psig although pressures between 500 and 3000 psig may be used. The product gas comprising carbon monoxide and hydrogen is cooled by indirect heat exchange with water for the production of steam and is then introduced into the coal-solvent slurry either in the solvation zone or heating zone. The steam so produced may be used in part in the gasification.

The remainder of the bottoms from the stripping zone, generally amounting to between about 50 and 80% of the residue, is gasified in an air gasifier using a gas comprising air as the gasifying agent at an oxygen to carbon atomic ratio of from 0.9 to 1.3 preferably from 0.95 to 1.2 with the addition of not more than about 0.1 lb. of steam per lb. of residue preferably less than 0.06 lb. per lb. Preferred reaction conditions in the air gasifier are temperatures between 2000° and 2800° F. and pressures of between 300 and 600 psig, although temperatures of between 1800° and 3200° F. and pressures between 100 and 1000 psig may be used. The product gas is cooled by heat exchange with water to produce steam and then is sent to the stripping zone as the stripping medium. Steam produced by the cooling of the product gas may be recycled to the gasifier and the balance may be used in conjunction with steam produced by the cooling of the oxygen gasifier product gas for the operation of a steam turbine which may also be coupled to an electric generator.

Reference is now made to the accompanying drawing in association with which an example of one method of practicing the present invention is disclosed. It will be apparent to those skilled in the art that various pieces of equipment such as pumps, valves, compressors and the like for the sake of simplicity have been omitted from the drawing.

Referring now to the drawing, Kentucky No. 11 bituminous coal is introduced into the system through line 11 into grinding and drying unit 12 where it is ground so that 100% passes through a 14 mesh sieve (U.S. Standard) and is dried by contact with nitrogen from line 14 to a moisture content of less than 3.0 wt. %. The dry coal is then fed through line 13 into slurry preparation unit 15 where with solvent from line 16 it is formed into a coal-solvent slurry having a solids concentration of 40 wt. %. The coal-solvent slurry then passes through line 17 to heating and solvation zone 18 where it is heated to a temperature of 800° F. and passed through the zone at a pressure of 1500 psig in the presence of hydrogen and carbon monoxide of combined 95% purity introduced through line 19 at a rate of 50 SCF per pound of coal fed to the heating and solvation zone. The slurry is maintained in the heating and solvation zone 18 at a temperature of 800° F. and a pressure of 1500 psig for a period of 15 minutes under conditions of turbulent flow and is then passed through line 20 to solvent stripping zone 21 which is maintained at a pressure of 500 psig.

A gas composed principally of 20.9% Co, 12.9% $H_2$ and 57.4% $N_2$ at a temperature of 900° F. is introduced into solvent stripping zone 21 through line 22 at a rate of 12,000 SCF per barrel of slurry to remove materials boiling below 900° F. through line 23, The overhead is then introduced into separation zone 24 which, as will be obvious to those skilled in the art, is made up of several separation units. Normally gaseous material is removed through line 25 and after cooling and removal of condensate is fed into gas purification zone 26 at ambient temperature where it is contacted with an aqueous ethanolamine solution for the removal of $H_2S$ and COS. The essentially sulfur-free product gas having a heating value of 150 BTU/cu. ft. is tranferred by means of line 27 to gas turbine 28 where with compressed air from line 29, it is subjected to combustion with the combustion products being expanded in gas turbine 28 for the operation of electrical generator 30.

Gas turbine 28 also operates air compressor 32 which compresses air introduced through line 33. Compressed air leaves compressor 32 through line 34, a portion being transferred to air separation unit 35 which supplies nitrogen for the drying in grinding and drying unit 12 through line 14. Oxygen from air separation unit 35 is sent by means of line 40 to oxygen gasifier 41 where with 23% of the material boiling above 900° F. from stripping unit 21 introduced through lines 42 and 43 to gasifier 41 and with steam from line 46 it is reacted to form a gas composed principally of $H_2$ and CO. The oxygen is supplied at an O:C atomic ratio of 0.95 with the steam being introduced at a rate of 0.4 pound per pound of slurry to obtain 99% conversion. Reaction conditions are a temperature of 2520° F. and a pressure of 1250 psig. The product gas from oxygen gasifier 41 is sent by means of line 47 to heat exchanger 48 and then through line 19 to heating-solvation unit 18. Alternatively in a separate embodiment, the partial oxidation product from oxygen gasifier 41 may be sent by means of line 50 to hydrogen generation unit 51 where it is subjected to shift conversion and then $CO_2$ removal with the production of substantially pure hydrogen which may be sent to heating solvation unit 18 by means of lines 52 and 19.

A portion of the compressed air leaving compressor 32 through line 34 passes through line 60 to air gasifier 61 where it is used for the partial oxidation of the balance of the 900° F. + material from stripper 21 introduced into air gasifier 61 through line 42. Steam for the gasification is supplied through line 47. The air is introduced into air gasifier 61 at an O:C atomic ratio of 1.1 with the steam being introduced at a rate of 0.04 pound per pound of bottoms from stripping zone 21. Air gasifier 61 is operated at a temperature of 2500° F. and a pressure of 500 psig. Hot product gas leaves air gasifier 61 through line 63, is partially cooled in heat exchanger 64 and supplies the hot stripping gas for stripping unit 21 through line 22. Steam optionally superheated from heat exchanger 64 is combined with optionally superheated steam from heat exchanger 48 in line 65 and then with superheated steam from line 70 formed by heat exchanging the exhaust gases from gas turbine 28 as they leave through line 71 and pass in indirect heat exchange with water from line 73 in heat exchanger 75. This combined high pressure steam is expanded through steam turbine 77 which operates electrical generator 78, the condensate being removed through line 79. Exhaust gases leaving heat exchanger 75 through line 80 are clean and may be exhausted to the atmosphere without pollution.

From liquid recovery unit 24, normally liquid material having an end point of 475° F. is withdrawn through line 100 and material boiling from 475° F. to 900° F. is sent from liquid recovery unit 24 through line 16 to slurry preparation unit 15. The 475° F. end point material in line 10 may be sent to storage vessel 103 by means of lines 104 and 105 or optionally may be sent to hydrotreating unit 106 for catalytic hydrodesulfurization and then transferred to storage vessel 103 through line 105. This material may be exported from the system or may be used directly as gas turbine feed for peak shaving by combusting the liquid fraction and expanding the resulting gaseous products through a gas turbine.

Several advantages over the prior art accrue from the method of my invention. They include the use of the sensible heat of the air gasification product to recover solvent, the production of a slipstream of clean distillate fuel for peak shaving, high overall gasification efficiency and conversion to power, the minimal emission of pollution products, the production of a gas turbine fuel having a heating value up to 250 BTU/SCF and the elimination of excessive cooling of the gas and scrubbing of the product gas from the air gasifier and/or the oxygen gasifier if CO plus $H_2$ is used for the liquefaction of the coal.

Other advantages are that the process has small oxygen plant requirements since only between about 20 and 50% of the residue needs to be gasified with oxygen and the air separation plant compressed air supply can be provided by a small slipstream from the gas turbine compressor.

Various modifications of the invention as hereinbefore set forth may be made without departing from the spirit and scope thereof, and therefore only such limitations should be made as are indicated in the appended claims.

We claim:

1. A process for the production of a fuel gas having a heating value of about 250 to 100 BTU/SCF which comprises mixing finely-divided solid fuel with a solvent therefor, heating the mixture to a temperature of between about 700° and 950° F. at a pressure between about 500 and 5000 psig, solubilizing at least a portion of said solid fuel in the presence of added hydrogen, separating from the resulting mixture material boiling below about 900° F. in a separating zone, subjecting between about 20 and 50% of the remainder, boiling above about 900° F., to partial oxidation with substantially pure oxygen in a first partial oxidation zone to produce a first product gas composed principally of CO and $H_2$, passing at least a portion of said first product gas to the solubilizing zone as said added hydrogen, subjecting the balance of said remainder boiling above about 900° F. to partial oxidation with a gas comprising air in a second partial oxidation zone to produce a second product gas comprising carbon monoxide, hydrogen and nitrogen, transferring said second product gas to said separation zone to assist in the separation of said portion boiling below about 900° F. and recovering from said portion boiling below about 900° F. a third product gas having a heating value between about 100 and 250 BTU/SCF.

2. The process of claim 1 in which said finely-divided solid fuel has a moisture content of less than 5.0 wt. %

3. The process of claim 1 in which the material boiling below about 900° F. is stripped from the resulting mixture by means of said second product gas.

4. The process of claim 3 in which said third product gas is purified by the removal of sulfur compounds therefrom.

5. The process of claim 3 in which the stripper overhead is separated into a normally gaseous fraction, a light hydrocarbon liquid fraction and a coal solvent fraction.

6. The process of claim 5 in which said light hydrocarbon liquid fraction is subjected to combustion and the gaseous products expanded through a gas turbine.

7. The process of claim 1 in which the third product gas is subjected to combustion and the hot combustion product gas is expanded through a gas turbine.

8. The process of claim 1 in which said first product gas is subjected to shift conversion and $CO_2$ removal prior to its introduction into the solubilizing zone.

9. The process of claim 1 in which said first product gas is subjected to indirect heat exchange with water and the resulting high pressure steam is used to operate a steam turbine.

10. The process of claim 1 in which said second product gas is subjected to indirect heat exchange with water and the resulting high pressure steam is used to operate a steam turbine.

* * * * *